Patented Oct. 4, 1949

2,483,736

UNITED STATES PATENT OFFICE 2,483,736

SULFURIZATION OF REACTION PRODUCT OF PHOSPHORUS PENTASULFIDE AND UNSATURATED ACYCLIC KETONE

Ferdinand P. Otto, Woodbury, N. J., and Ronald E. Meyer, Cumberland, Md., assignors to Socony-Vacuum Oil Company, Incorporated, a corporation of New York No Drawing. Original application July 25, 1945, Serial No. 607,090. Divided and this application November 15, 1946, Serial No. 710,230

5 Claims. (Cl. 260—125)

This invention has to do with new reaction products which may be generally designated as phosphorus- and sulfur-containing reaction products obtained by reaction of an unsaturated ketone, phosphorus pentasulfide and elementary sulfur.

The present invention is predicated upon the discovery that the reaction products contemplated herein when blended with a viscous mineral oil fraction such as a hydrocarbon lubricating oil, will improve various properties of the oil. For example, these reaction products will inhibit oxidation of the oil, thereby retarding the formation of sludge and acidic products. They also retard changes in viscosity in the oil, with temperature change during use.

It is to be understood, however, that the present invention is not concerned with mineral oil compositions, such compositions forming the subject matter of our copending application, Serial Number 493,868, filed July 8, 1943, now Patent No. 2,383,497, of which the present application is a continuation-in-part and to which reference is made for further details in the composition of these reaction products.

It is to be understood that the use of the reaction products of this invention is not confined to the improvement of mineral oil fractions. By way of illustration they may be used as cutting oils, rubber accelerators, extreme pressure lubricants and as intermediates in the production of other chemical compositions. Numerous other uses and applications of these reaction products will be readily apparent to those skilled in the art from the description of their composition and typical methods for preparing them, as provided hereinafter.

The phosphorus- and sulfur-containing reaction products are stable, non-corrosive and are obtained by reacting substantially one mol of phosphorus pentasulfide with four mols of a sulfurized ketone at a temperature above about 100° C. and below the decomposition temperature of the reaction product, the sulfurized ketone having been obtained by sulfurizing an unsaturated ketone with elementary sulfur at a temperature above about 150° C. and below the decomposition temperature of the said sulfurized ketone.

While all unsaturated ketones may be used herein, typical of which are didecenyl ketone, phorone, particularly preferred is dioleyl ketone which is also known in the art as diheptadecenyl ketone. Contemplated for use also is a technical grade of diheptadecenyl ketone, commonly known as "oleone."

We have found that the character of the reaction products of this invention is influenced to a large degree by the reaction temperature in the $P_2S_5$ reaction. For example, when the reaction of $P_2S_5$ and dioleyl ketone, or of $P_2S_5$ and the aforesaid sulfurized dioleyl ketone, is carried out at a temperature in the neighborhood of 140° C., the reaction product has a relatively high neutralization number (N. N.), which is a measure of its acidity; whereas, when the reaction temperature is maintained at about 200° C., the neutralization number of the reaction product is much lower. In other words, a relatively high temperature of the order of 200° C. or more may be resorted to in order to obtain slightly acidic, or even neutral reaction products. The phosphorus and sulfur content of the reaction products of $P_2S_5$ and dioleyl ketone and similarly of the reaction products of $P_2S_5$ and the aforesaid sulfurized ketone, obtained by varying the reaction temperature is not so effected inasmuch as such reaction products contain phosphorus and sulfur chemically combined at substantially the same molar ratio as in $P_2S_5$.

Although the exact chemical structure of the reaction products of this invention is not known at this time, our investigations have indicated that elementary sulfur most probably reacts at the olefin bonds of an unsaturated ketone and correspondingly at the olefin bonds of the unsaturated ketone-$P_2S_5$ reaction products; and have also indicated that $P_2S_5$ most probably reacts at the carbonyl group of unsaturated ketones and at the same group of a sulfurized unsaturated ketone. This is indicated by the substantial absence of an evolution of hydrogen sulfide during the reaction with elementary sulfur and during the reaction with $P_2S_5$. It is also borne out by the fact that almost as much $P_2S_5$ combines chemically with the sulfurized ketone (unsaturated) as with unsulfurized unsaturated ketones.

The reaction products of this invention are believed to be novel in that previous disclosures have shown that compounds containing sulfur, not phosphorus and sulfur, are formed in the reaction of $P_2S_5$ with certain ketones. More specifically, Spring in the Bull. Soc. Chim. (France) 2, 40, 67, has disclosed that a dimer thioketone, $C_6H_{12}S_2$, is obtained when acetone is warmed with $P_2S_5$; and Gatterman in the Ber. 28, 2877, has disclosed that thiobenzophenone is obtained when benzophenone in benzene solution is heated with $P_2S_5$ for several hours at 130° C. in a bomb.

The sulfurized ketones which are reacted with $P_2S_5$ to form reaction products contemplated herein are obtained by heating an unsaturated ketone with elementary sulfur at an elevated temperature, particularly at a temperature above about 150° C. Preferred of such sulfurized ketones are those obtained by treating an unsaturated ketone with from about 5 to about 15 parts of elementary sulfur at a temperature from about 175° C. to about 200° C. The sulfurized ketones so obtained are stable and non-corrosive, and are then reacted with $P_2S_5$. While the reaction with $P_2S_5$ and certain sulfurized ketones may be carried out at temperatures above about 100° C., it is preferred that the reaction temperatures used fall within the temperature range of 140° C. to 200° C. In this reaction the molar ratio of sulfurized ketones to $P_2S_5$ is 4:1. This reaction is carried out for a sufficient time in order that the reaction product so obtained will be non-corrosive to a polished copper strip immersed in a 1 per cent blend of the reaction product in mineral oil for 3 hours at 150° C.

Similarly, an unsaturated ketone may be reacted with $P_2S_5$ in a molar ratio of 4:1 at the aforesaid reaction temperatures above about 100° C. and the phosphorus- and sulfur-containing reaction products so obtained may then be reacted with elementary sulfur at an elevated temperature. In this regard, the amount of elementary sulfur used and the reaction temperature employed will be as indicated above.

Several modifications of the procedure described above may be resorted to for the obtainment of particularly desirable products. We have found that the use of a non-oxidizing or inert gas, such that the reaction mixture is under a non-oxidizing atmosphere, provides us with reaction products characterized by a high degree of stability. Inert gases, such as nitrogen, carbon dioxide, etc., may be used for this purpose in both the $P_2S_5$ reaction and in the sulfurizing reaction. As another modification unreactive or substantially inert diluents such as acid treated kerosene may be used during these reactions, or may be admixed with the reaction products so obtained to aid in refining the same, and may be removed thereafter by a suitable means such as by distillation. For example, a mineral oil may be used as an inert diluent in order to obtain a mineral oil blend or concentrate of the desired reaction product.

The reaction products contemplated herein and the preparation thereof are illustrated by the following typical examples in which a particularly preferred ketone, oleone, is used:

EXAMPLE 1

REACTION PRODUCT OF SULFURIZED OLEONE AND $P_2S_5$ IN MINERAL OIL (a) *Preparation of sulfurized oleone*

Seventy-five grams of oleone, 8.5 grams of elementary sulfur and 150 grams of mineral oil diluent (Saybolt Universal viscosity of 67 seconds at 210° F.) are charged to a reaction vessel equipped with a mechanically-driven stirrer, an upright Liebig condenser, a thermometer and an inlet tube extending to within a few inches above the mixture. The atmosphere above the mixture is constantly swept with nitrogen gas (introduced through the aforesaid inlet tube) in order to maintain a non-oxidizing atmosphere above the mixture. The mixture is stirred and heated at 170° C. for 3 hours and the reaction product so obtained is sulfurized oleone.

(b) *Preparation of sulfurized oleone-$P_2S_5$ reaction product*

The reaction product obtained in (a) is allowed to cool to 140° C. and 9.0 grams of $P_2S_5$ are then added. The reaction mixture is stirred and heated at 140° C. for 2 hours and is then filtered through "Hi-Flo" on a steam heated Büchner funnel in order to remove any deleterious by-products and any unreacted $P_2S_5$. The reaction product is a brown viscous oil containing 5.1 per cent sulfur and 0.67 per cent phosphorus and has a neutralization number (N. N.) of 14.5. This product is referred to hereinafter as product 1.

A three per cent blend of this sulfurized oleone-$P_2S_5$ reaction product obtained in mineral oil, that is, a 1 per cent blend of this concentrate in mineral oil, caused only a slight tarnish or discoloration of a polished copper strip immersed in said blend for 3 hours at 150° C.

EXAMPLE 2

REACTION PRODUCT OF OLEONE-$P_2S_5$ AND SULFUR IN MINERAL OIL (a) *Preparation of oleone-$P_2S_5$ reaction product*

Sixty-five grams of mineral oil diluent (Saybolt Universal viscosity of 67 seconds at 210° F., 60 grams of oleone and 6.6 grams of $P_2S_5$ were charged to a vessel equipped as described in Example 1 (a), and were stirred and heated at 200° C. for 2½ hours. The reaction mixture was then filtered through "Hi-Flo" on a steam heated Büchner funnel in order to remove any deleterious by-products and any unreacted $P_2S_5$.

(b) *Preparation of oleone-$P_2S_5$ and sulfur reaction products*

One hundred and thirty grams of the oleone-$P_2S_5$ reaction product obtained in (a), that is, a 1:1 blend of the product in mineral oil, was heated with 6 grams of elementary sulfur at 170° C. for 2 hours. As the reaction product thus obtained was gelatinous, 130 grams of mineral oil were added thereto in order to obtain a fluid mixture. The final product, a 1:3 blend in mineral oil, analyzed as follows: 0.51 per cent phosphorus, 3.94 per cent sulfur and 2.9 neutralization number. This product is identified hereinafter as product 2.

This application is a division of application Serial Number 607,090, filed July 25, 1945, now Pat. No. 2,459,090.

It is to be understood that although we have described certain typical procedures for preparing the reaction products contemplated herein and have shown illustrative reaction products, the invention is not limited to the particular procedures or products, but includes within its scope such changes and modifications as fairly come within the spirit of the appended claims.

We claim:

1. A process for the preparation of a phosphorus- and sulfur-containing reaction product which comprises sulfurizing an intermediate phosphorus- and sulfur-containing reaction product with elementary sulfur at a temperature above about 150° C. and below the decomposition temperature of said first-mentioned reaction product, said intermediate reaction product being obtained by reacting substantially one mol of phosphorus pentasulfide with four mols of an unsaturated acylic ketone containing no substituents other than hydrogen at a temperature above about 100° C. and below the decomposition temperature of said intermediate reaction product.

2. A process for the preparation of a phosphorus- and sulfur-containing reaction product which comprises sulfurizing an intermediate phosphorus- and sulfur-containing reaction product with elementary sulfur at a temperature between about 150° C. and about 200° C., said intermediate reaction product being obtained by reacting substantially one mol of phosphorus pentasulfide with four mols of an unsaturated acyclic ketone containing no substituents other than hydrogen at a temperature between about 100° C. and about 200° C.

3. A process for the preparation of a phosphorus- and sulfur-containing reaction product which comprises sulfurizing an intermediate phosphorus- and sulfur-containing reaction product with from about 5 per cent to about 15 per cent by weight of elementary sulfur at a temperature above about 150° C. and below the decomposition temperature of said first-mentioned reaction product, said intermediate reaction product being obtained by reacting substantially one mol of phosphorus pentasulfide with four mols of an unsaturated acyclic ketone containing no substituents other than hydrogen at a temperature above about 100° C. and below the decomposition temperature of said intermediate reaction product.

4. A process for the preparation of a phosphorus- and sulfur-containing reaction product which comprises sulfurizing an intermediate phosphorus- and sulfur-containing reaction product with elementary sulfur at a temperature between about 150° C. and about 200° C., said intermediate reaction product being obtained by reacting substantially one mol of phosphorus pentasulfide with four mols of dioleyl ketone at a temperature between about 100° C. and about 200° C.

5. A process for the preparation of a phosphorus- and sulfur-containing reaction product which comprises sulfurizing an intermediate phosphorus- and sulfur-containing reaction product with about 10 per cent by weight of elementary sulfur at about 170° C., said intermediate reaction product being obtained by reacting substantially one mol of phosphorus pentasulfide with four mols of dioleyl ketone at about 200° C.

FERDINAND P. OTTO.
RONALD E. MEYER.

REFERENCES CITED

The following references are of record in the file of this patent:

UNITED STATES PATENTS

| Number | Name | Date |
|---|---|---|
| 2,383,494 | Moran et al. | Aug. 28, 1945 |
| 2,415,837 | Musselman et al. | Feb. 18, 1947 |